Jan. 16, 1968  G. STONE  3,363,505
LUMINANCE MEASURING APPARATUS
Filed Dec. 3, 1963  2 Sheets-Sheet 2

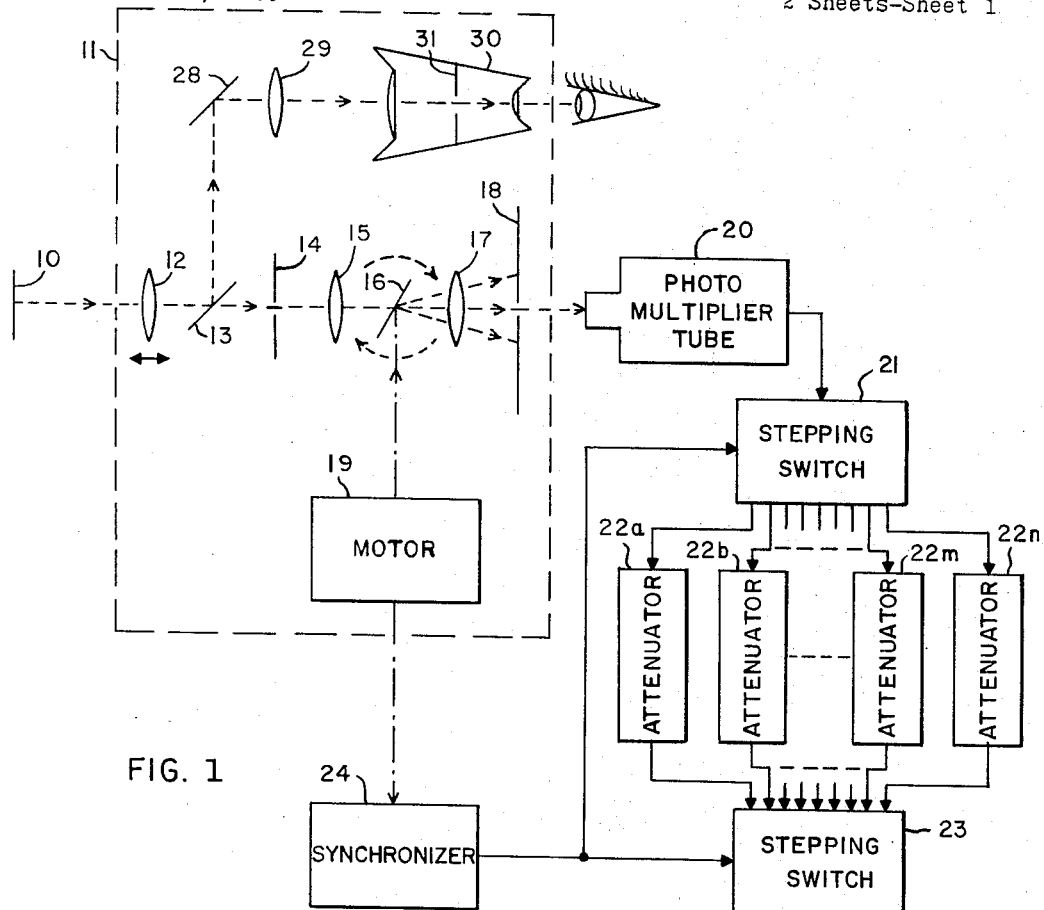
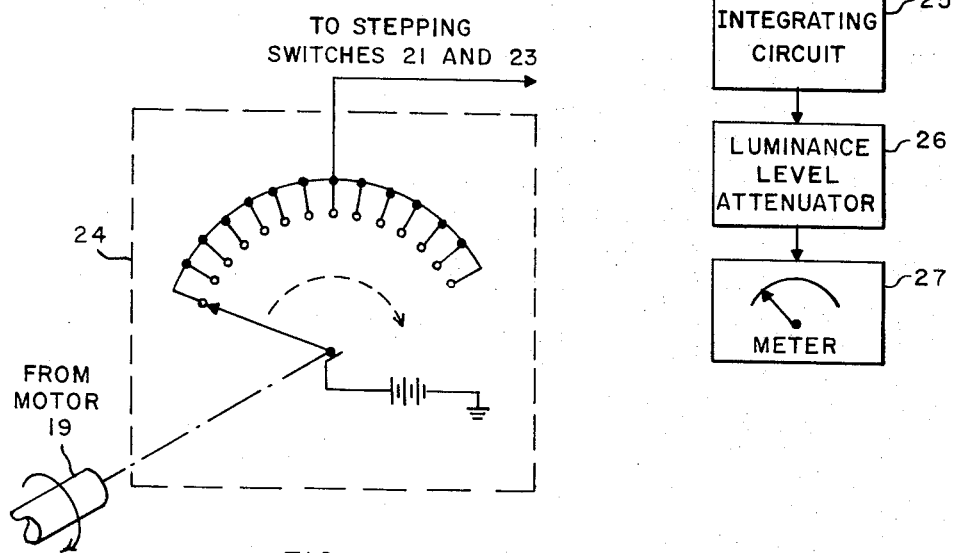

United States Patent Office 3,363,505
Patented Jan. 16, 1968

3,363,505
LUMINANCE MEASURING APPARATUS
Gerald Stone, Syosset, N.Y., assignor to Hazeltine
Research, Inc., a corporation of Illinois
Filed Dec. 3, 1963, Ser. No. 327,749
2 Claims. (Cl. 88—23)

ABSTRACT OF THE DISCLOSURE

The luminance of a source is accurately measured by sweeping the light spectrum of the source past a photo detector to produce at the detector's output, a signal which has individual portions representative of the applied spectral components. At least some of the signal portions are sampled and the samples proportioned in amplitude according to the luminance sensitivity of the normal eye. The proportioned samples are then recombined, integrated, and the integrated signal adjusted in amplitude to derive a final output signal which is indicative of the luminance of the source and can be displayed on a meter. Other embodiments are covered.

---

The present invention relates, in general, to apparatus for measuring luminance. More particularly, the present invention relates to such apparatus which is more easily calibrated and has a greater inherent accuracy than prior such apparatus.

The luminance [B] of a source of light, or luminous flux, may be found using the following basic equation.

$$B = K \int_0^\infty I(\lambda) L(\lambda) d\lambda \quad \text{(Equation 1)}$$

Where:
$B$ = luminance
$K$ = proportionality constant
$I(\lambda)$ = ICI relative luminosity function which describes the normal eye sensitivity to light as shown in FIG. 3.
$L(\lambda) d\lambda$ = luminous flux in the wavelength range between $\lambda$ and $(\lambda + d\lambda)$.

One prior art technique for measuring luminance makes use of a photoelectric device which is corrected to the eye sensitivity, and which yields an electric current or voltage proportional to the integral in Equation 1, set forth above. The fact that a photoelectric device, suitably corrected, can perform the multiplication and integration required in Equation 1 is the advantage of such type of measuring equipment. However, the major limitation of such equipment lies in the method used to correct the photoelectric device to the eye response at all wavelengths. Conventionally, such correction takes the form of an optical filter having a correction factor $C(\lambda)$ which must correct for $R(\lambda)$, the relative response of the photoelectric device, and for $A(\lambda)$, the relative response of any optical components of the equipment, such as lenses and mirrors, which act on the spectrum of light being measured. In this case, Equation 1 may be rewritten as follows:

$$B = K \int_0^\infty C(\lambda) [A(\lambda) R(\lambda)] L(\lambda) d\lambda \quad \text{(Equation 2)}$$

where:

$$I(\lambda) = C(\lambda) [A(\lambda) R(\lambda)] \quad \text{(Equation 3)}$$

However, since $$C(\lambda) = \frac{I(\lambda)}{[A(\lambda) R(\lambda)]} \quad \text{(Equation 4)}$$

a major problem appears in that to accurately solve for the correction factor $C(\lambda)$, both $A(\lambda)$ and $R(\lambda)$ must be determined to a high degree of accuracy. This alone is a difficult problem. Yet, even if $A(\lambda)$ and $R(\lambda)$ are known, an even greater problem lies in constructing, or synthesizing, an optical filter so as to yield the required correction factor $C(\lambda)$ at all wavelengths.

If the spectrum of light being measured is relatively fixed, the equipment error in responding to the spectrum may be calibrated out of the measurement. However, this limits use of the equipment to a single spectrum, or to all spectra for which a calibration of the equipment is known. This establishes the requirement that the spectrum of the incident light be predetermined, which is highly impractical.

It is therefore an object of the present invention to provide new and improved luminance measuring apparatus, which apparatus is not beset by the disadvantages and limitations of prior such apparatus.

It is another object of the present invention to provide new and improved luminance measuring apparatus, which apparatus is more easily calibrated than prior such apparatus.

It is an additional object of the present invention to provide new and improved luminance measuring apparatus, which apparatus does not require the adjustment of optical filters for proper operation.

It is still another object of the present invention to provide new and improved luminance measuring apparatus, which apparatus is capable of measuring luminance due to any luminous spectrum to a degree of accuracy heretofore unattainable in prior such apparatus.

In accordance with the present invention, luminance measuring apparatus comprises means for dividing light from a source whose luminance is to be measured into its spectral components and for applying the spectral components individually to sensing means set forth hereinafter. The apparatus further include sensing means, responsive to the applied spectral components, for generating a first output signal having individual portions thereof representative of each of the applied spectral components. The apparatus also includes means for sampling at least some of the individual portions of the first output signal to produce sample signals, representative of respective spectral components; means for attenuating each of the sample signals to produce a corresponding attenuated sample signal which is proportioned according to the luminance sensitivity of the normal eye for those spectral components represented by the corresponding sample signal; means responsive to the attenuated sample signals for generating a second output signal representative of the integral of the attenuated sample signals, and means for adjusting the amplitude of the second output signal to derive a final output signal which is proportioned according to the luminance sensitivity of the normal eye and indicative of the luminance of the source.

For a better understanding of the present invention, together with other and further objects thereof, reference is had to the following description taken in connection with the accompanying drawings, and its scope will be pointed out in the appended claims.

Referring to the drawings:

FIG. 1 is a block diagram of a representative embodiment of luminance measuring apparatus constructed in accordance with the present invention;

FIG. 2 is a schematic diagram of a representative embodiment of the conventional mechanical synchronizer 24;

Description of apparatus of FIG. 1

Figure 4:
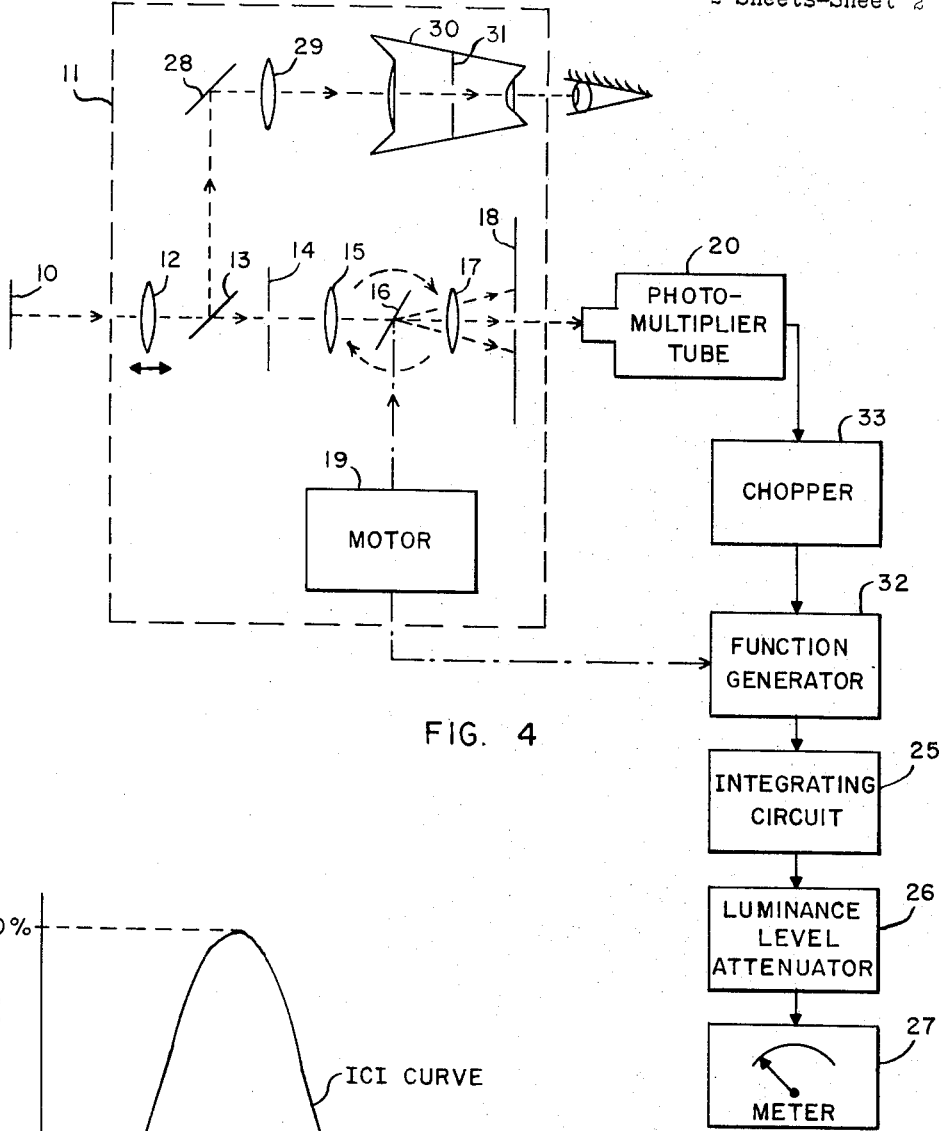
FIG. 4 is a block diagram of another form of luminance measuring apparatus constructed in accordance with the present invention.

The luminance measuring apparatus of FIG. 1 includes those units within the dotted box 11, for dividing light from a source whose luminance is to be measured into its spectral components, and for applying the spectral components individually to sensing means hereinafter set forth.

As shown in FIG. 1, the units within dotted box 11 include a variable focus objective lens 12, for focusing light, or luminous flux as it may be termed, from source 10 onto the adjustable width slit of device 14, which slit lies in a plane perpendicular to the plane of the drawing of FIG. 1. Included in dotted box 11 and positioned between lens 12 and device 14 is a partially-silvered mirror 13 which serves to divide the luminous flux from source 10 into two portions as shown in FIG. 1.

Dotted box 11 also includes a front-surfaced mirror 28, a telescope objective lens 29 and a viewing telescope 30, which telescope 30 contains a reticle 31. The aforementioned units are provided in order to permit a user of the apparatus shown in FIG. 1 to focus lens 12 on the source of luminous flux 10, and to define, via reticle 31, a particular area of source 10 whose luminance is to be measured.

There is also included in the dotted box 11, a collimating lens 15 for collimating the luminous flux which passes through the slit in device 14. The collimated luminous flux is then applied to a rotatable diffraction grating 16, whose axis of rotation is perpendicular to the plane of the drawing of FIG. 1. Components of the spectrum created by diffraction grating 16 are imaged onto the adjustable width slit of device 18 by an imaging lens 17. The aforementioned slit in device 18 lies in a plane perpendicular to the plane of the drawing of FIG. 1.

The dotted box 11 finally includes a motor 19 for rotating both diffraction grating 16 and an input shaft of a synchronizer 24 at the same predetermined speed.

The apparatus of FIG. 1 further includes a sensing means which is photomultiplier tube 20, responsive to the applied spectral components, for generating a first output signal having individual portions thereof representative of each of the applied spectral components.

The apparatus of FIG. 1 also includes the combination of first stepping switch 21, attenuators 22a through 22n inclusive, second stepping switch 23 and synchronizer 24, for sampling at least some of the individual portions of the first output signal, from photomultiplier 20, to produce sample signals representative of respective spectral components and for attenuating each of the sample signals to produce a corresponding attenuated sample signal which is proportioned according to the luminance sensitivity of the normal eye for those spectral components represented by the corresponding sample signal.

The output of photomultiplier tube 20 is coupled to the input of first stepping switch 21, while each of the outputs of stepping switch 21 is coupled, in turn, to the input of a corresponding one of the attenuators 22a through 22n inclusive. The output of each of the attenuators 22a through 22n inclusive is coupled to a corresponding input of second stepping switch 23.

Stepping switches 21 and 23 both have a control input which is coupled to the output of synchronizer 24. In turn, synchronizer 24 has its input coupled to the diffraction grating drive motor 19. The purpose of synchronizer 24 is to provide the stepping pulses required by stepping switches 21 and 23, and to insure that stepping switches 21 and 23 operate in synchronism with each other, and also in synchronism with the rotation of the diffraction grating 16 as will be described more fully hereinafter. Synchronizer 24 may be of any conventional design, such as that shown in FIG. 2, which utilizes a commutator to generate the stepping pulses required by stepping switches 21 and 23.

The apparatus of FIG. 1 finally includes an integrator 25 and luminance level attenuator 26, coupled in cascade, in the order named, to the output of second stepping switch 23 for processing the attenuated samples to derive a final output signal indicative of the luminance of the source. More particularly, the combination of stepping switch 23 and integrator 25 may be considered a means responsive to the attenuated sample signals for generating a second output signal representative of the integral of the attenuated sample signals. Furthermore, luminance level attenuator 26 may be considered as means for adjusting the amplitude of the second output signal to derive the aforementioned final output signal.

In the example of FIG. 1, the output of attenuator 26 is shown coupled to the input of a meter 27; however, it will be obvious that the output of attenuator 26 may be coupled to any other type of display or measuring device equally as well. In the present example, meter 27 serves only to measure the output signal of attenuator 26, which signal is indicative of the luminance of the source of luminous flux 10.

Operation of the apparatus of FIG. 1

In operation the apparatus of FIG. 1 functions as follows. Luminous flux, $L(\lambda)$, from source 10 is focused by focusing lens 12 onto the slit in device 14. Between lens 12 and device 14, partially-silvered mirror 13 reflects a portion of the luminous flux toward the conventional front surface mirror 28. Mirror 28 reflects the incident luminous flux through the telescope objective lens 29 into the viewing telescope 30.

The luminous flux which passes through the slit in device 14 is collimated by lens 15 and applied to diffraction grating 16. As diffraction grating 16 is rotated by motor 19 at a predetermined speed, for example two revolutions per minute, once during each revolution grating 16 will divide the incident collimated luminous flux into its spectral components. This process, in effect, sweeps the spectrum of the incident collimated luminous flux across the slit in device 18, via the imaging lens 17. Since the entire spectrum is swept past the slit in device 18 during only a very small portion of a revolution of diffraction grating 16, i.e. approximately 11 degrees, a large amount of time is wasted in completing the revolution. This wasted time may be eliminated, for example, by rocking diffraction grating 16 only through its effective angle instead of rotating it through an entire revolution.

The adjustable width slit in device 18 is adjusted to permit only a very narrow band of wavelengths of light to be applied to photomultiplier tube 20. Thus photomultiplier tube 20 will detect the components of the spectrum created by grating 16 as they are swept past the slit in device 18. The output signal from photomultiplier tube 20 is therefore a function of relative light and the wavelength of that light, or:

$$KA(\lambda)R(\lambda)L(\lambda) \text{ versus } \lambda(t) \quad \text{(Equation 5)}$$

where:

$K$ = proportionality constant
$L(\lambda)$ = luminous flux from source 10
$A(\lambda)$ = relative response of the optical components which act on the luminous flux $L(\lambda)$
$R(\lambda)$ = relative response of the sensing device, which in the present example is photomultiplier tube 20
$\lambda(t)$ = function which represents the rate at which the spectrum produced by diffraction grating 16 is swept past the slit in device 18.

The output signal of photomultiplier tube 20 is applied to first stepping switch 21, which switch is operated in synchronism with the rotation of diffraction grating 16. This is brought about through synchronizer 24 which is driven from the same motor 19 that also rotates the diffraction grating 16. First switch 21 operates to sample the output signal of photomultiplier tube 20, and thus the spectral components produced by the action of diffraction grating 16. The sampling rate of first switch 21 is determined by synchronizer 24, which supplies the required stepping pulses for first and second stepping switches 21 and 23. Each sample, which consists of a signal representative of a predetermined portion of the spectrum, is applied to a given one of the attenuators 22a through 22n inclusive.

In the example of FIG. 1, only fourteen attenuators, attenuators 22a through 22n inclusive, are shown. Hence, only fourteen samples of the output signal from photomultiplier tube 20 are taken by first stepping switch 21 each time the spectrum created by diffraction grating 16 is swept past the slit in device 18. It will be noted that the number fourteen has been selected merely as an example, and is not meant to impose any limits on the number of times the output signal of photomultiplier tube 20 may be sampled for each rotation of diffraction grating 16.

Each sample of the output signal derived by photomultiplier tube 20 may be represented by Equation 5 evaluated at a predetermined wavelength. Thus the sample signals may be written as: $KA(\lambda_a)R(\lambda_a)L(\lambda_a)$; $KA(\lambda_b)R(\lambda_b)L(\lambda_b)$; ... $KA(\lambda_n)R(\lambda_n)L(\lambda_n)$. Each of these sample signals is applied to a corresponding one of the attenuators 22a through 22n inclusive, which operate to introduce the correction factor $C(\lambda)$ into each sample. Thus, the attenuated sample signals which appear at the outputs of the attenuators 22a through 22n inclusive may be written as: $KC(\lambda_a)A(\lambda_a)R(\lambda_a)L(\lambda_a)$; $KC(\lambda_b)A(\lambda_b)R(\lambda_b)L(\lambda_b)$; ... $KC(\lambda_n)A(\lambda_n)R(\lambda_n)L(\lambda_n)$.

After attenuation, the attenuated sample signals are recombined by second stepping switch 23 which is also operated in synchronism with first stepping switch 21 and with diffraction grating 16. The recombined samples which appear at the output of second stepping switch 23 are applied to integrator 25 which serves to perform the integration given by the equation:

$$B = K \int_0^\infty C(\lambda)A(\lambda)R(\lambda)L(\lambda)d\lambda$$

(Equation 6)

However, integrator 25 does not, in fact, perform the exact integration given by Equation 6. Instead, Equation 6 may be approximated by replacing the limits with, $$B = K \int_{4000 \text{ A.}}^{7000 \text{ A.}} C(\lambda)A(\lambda)R(\lambda)L(\lambda)d\lambda$$

(Equation 7)

Figure 3:
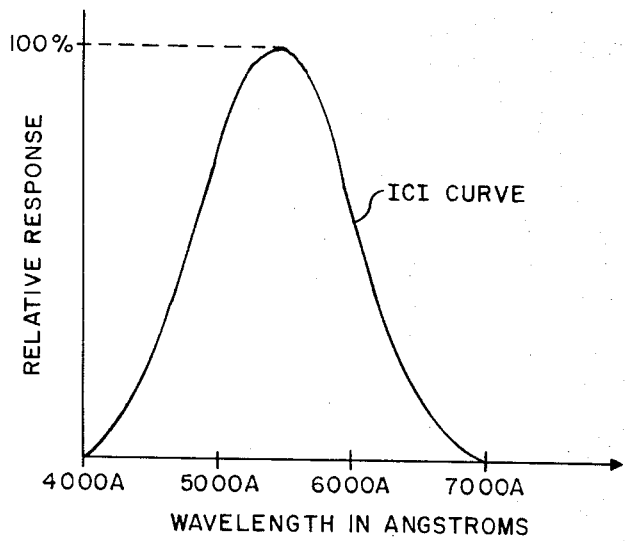
FIG. 3 is a graphical plot of the ICI relative luminosity function $I(\lambda)$.

This is a valid approximation due to the fact that $[C(\lambda)A(\lambda)R(\lambda)]$, or in other words $I(\lambda)$, approaches zero as $(\lambda)$ approaches either 4000 Angstroms (A.) or 7000 A., while $L(\lambda)$ is finite, as shown in FIG. 3.

A further approximation may be made to the integral of Equation 7 and is given by:

$$B = K \sum_{x=a}^{n} C(\lambda_x)A(\lambda_x)R(\lambda_x)\Delta\lambda_x$$

(Equation 8)

Integrator 25, therefore, performs the summation given by Equation 8, in which the individual terms are the attenuated sample signals which are presented sequentially at the output of second stepping switch 23, as mentioned previously.

The resultant signal from integrator 25 is applied to luminance level attenuator 26, which serves to introduce the constant [K]. Thus the output signal from level attenuator 26 is indicative of the true luminance [B], of source 10, and may be measured and displayed by applying the output signal from level attenuator 26 to the meter 27, for example.

It will be noted that any variation, such as flicker, in the light, or luminous flux, from source 10 will effect the final reading of luminance as viewed on meter 27. This may be obviated by slowing the sampling rate of the apparatus of FIG. 1 so that the samples taken cover several cycles of flicker, thus measuring an average value of luminance.

Before the apparatus of FIG. 1 may be used to measure luminance, it must necessarily be calibrated. The simplicity of this process in the present invention will be greatly appreciated by those persons who have experienced the complex and costly calibration procedures which are a frequent necessity with prior conventional luminance measuring apparatus.

Calibration of the apparatus of FIG. 1 is accomplished by replacing source 10 with any source of luminous flux having a known spectrum. This standard source may be, for example, a tungsten filament lamp at a known color temperature.

Since the relative luminosity function $I(\lambda)$, shown in FIG. 3, is known, and the spectrum $L(\lambda)$ for the calibrating light source is known, therefore their product $[I(\lambda)][L(\lambda)]$, is also known. This product will have a maximum at some particular wavelength $(\lambda_M)$. This wavelength may be left unattenuated in the attenuators 22a through 22n inclusive of FIG. 1. However, the remaining attenuators are then adjusted for the proper output, $[I(\lambda)][L(\lambda)]$, at each sampled wavelength $\lambda_a$, $\lambda_b$, ... $\lambda_n$. Once the attenuators 22a through 22n inclusive have been adjusted for the known calibrating spectrum any other spectrum may be measured without further calibration.

The final step in the calibration procedure involves adjusting level attenuator 26 until the proper luminance value for the known source being measured is read on the scale of meter 27. Once this has been done luminance may be measured for any other source of light, or luminous flux.

In FIG. 4 of the drawings there is shown another form of the luminance measuring apparatus shown in FIG. 1 and described hereinbefore. The modification of FIG. 4 consists of replacing stepping switches 21 and 23, attenuators 22a through 22n inclusive and synchronizer 24 with a function generator 32, such as the commercially available Vernistat Function Generator, manufactured by the Perkin-Elmer Corp., Norwalk, Conn.

Function generator 32 is essentially an autotransformer having a plurality of adjustable output taps which are sampled sequentially by an internal commutator. Each output tap of function generator 32 is adjustable from 0% to 100% of the input voltage in 1% increments. Thus each output tap of function generator 32 is analgous to the output of one of the attenuators 22a through 22n inclusive in FIG. 1. The internal commutator of function generator 32 is driven directly from the same motor 19 which drives diffraction grating 16. Hence, the need for synchronizer 24 is eliminated. In the present example, function generator 32 is an A.C. device. For this reason, chopper 33 is required to convert the D.C. output of photomultiplier tube 20 to A.C. for input to function generator 32.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:
1. Luminance measuring apparatus, comprising:
   means for dividing light from a source whose luminance is to be measured into its spectral components and for applying said spectral components individually to sensing means set forth hereinafter;
   sensing means, responsive to said applied spectral components, for generating a first output signal having individual portions thereof representative of each of said applied spectral components;
   means for sampling the individual portions of said out- put signal, and for attenuating each of said samples by a predetermined amount;

means responsive to said attenuated samples for generating a second output signal representative of the integral of said attenuated samples;

and means for attenuating said second output signal by a predetermined amount to derive a final output signal indicative of the luminance of said source.

2. Luminance measuring apparatus, comprising:

means for dividing light from a source whose luminance is to be measured into its spectral components and for applying said spectral components individually to sensing means set forth hereinafter;

sensing means, responsive to said applied spectral components, for generating a first output signal having individual portions thereof representative of each of said applied spectral components;

means for sampling the individual portions of said output signal, and for attenuating each of said samples by a predetermined amount;

means responsive to said attenuated samples for generating a second output signal representative of the integral of said attenuated samples;

means for attenuating said second output signal by a predetermined amount to derive a final output signal indicative of the luminance of said source;

and means for displaying said final output signal in visual form.

References Cited

UNITED STATES PATENTS

| | | | |
|---|---|---|---|
| 2,444,560 | 7/1948 | Feldt et al. | 88—14 |
| 2,602,368 | 7/1952 | Barnes | 88—14 |
| 2,653,200 | 9/1953 | Foster et al. | 335—123 X |
| 2,656,468 | 10/1953 | Schlesman | 88—14 X |
| 3,067,332 | 12/1962 | Peras | 88—14 X |
| 3,080,790 | 3/1963 | Morgan | 250—207 X |

OTHER REFERENCES

Hahn et al.: "An Atomic Absorption Spectrometer," Applied Optics, vol. 2, No. 9, September 1963, pp. 931–936.

JEWELL H. PEDERSEN, *Primary Examiner.*

W. A. SKLAR, *Assistant Examiner.*